No. 629,984.  
N. BURR.  
CLOTHES LINE REEL.  
(Application filed Oct. 6, 1898. Renewed June 30, 1899.)  
(No Model.)
Patented Aug. 1, 1899.
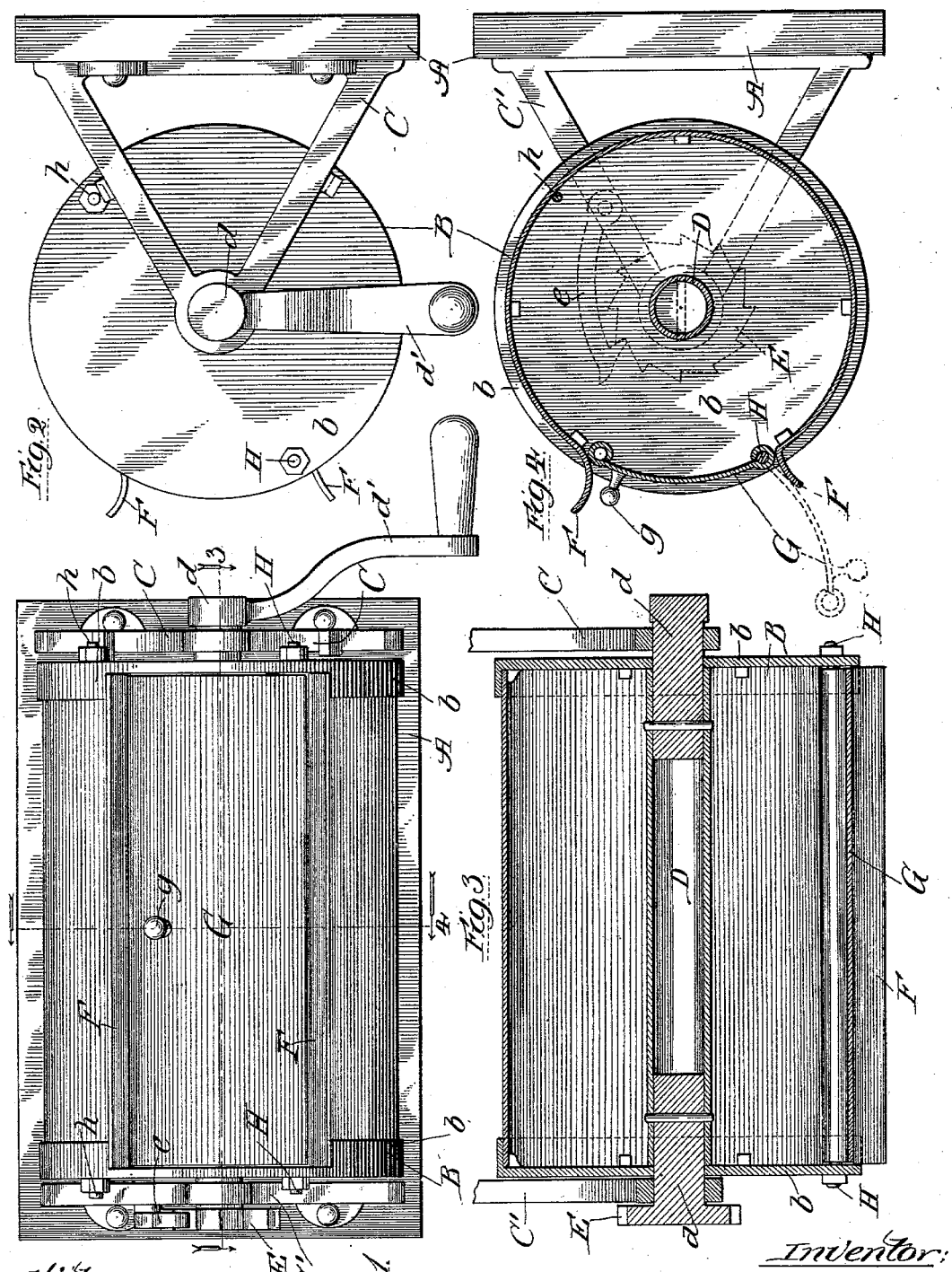
Inventor:  
Nelson Burr  
By Louis K. Gillson Atty.
Witnesses:

United States Patent Office.

NELSON BURR, OF BATAVIA, ILLINOIS.

CLOTHES-LINE REEL.

SPECIFICATION forming part of Letters Patent No. 629,984, dated August 1, 1899.

Application filed October 6, 1898. Renewed June 30, 1899. Serial No. 722,472. (No model.)

*To all whom it may concern:*

Be it known that I, NELSON BURR, a citizen of the United States of America, and a resident of Batavia, county of Kane, and State of Illinois, have invented certain new and useful Improvements in Clothes-Line Reels, of which the following is a specification, and which are fully illustrated in the accompanying drawings, forming a part thereof, in which—

Figure 1 is a front elevation of the clothes-line reel. Fig. 2 is an end elevation of the same. Fig. 3 is a longitudinal section on the line 3 of Fig. 1, and Fig. 4 is a transverse section on the line 4 of Fig. 1.

The invention relates to that class of clothes-line reels which are intended to be secured to a permanent support and in which the line is wound upon a shaft or windlass.

The object of the invention is to provide a cheap and efficient reel of this class in which the line may be so incased when stored that it will not only be kept dry, but protected from dust and dirt. This object is attained by mounting upon the windlass-shaft an oscillating drum or case having an openable side through which the line may be drawn; and the invention consists in the various parts and arrangement of parts, as hereinafter fully pointed out.

A supporting-plate is shown at A and may of course be a portion of a post or of a building, or a separate plate may be used, as shown, by means of which the device as a whole may be attached to a permanent support. The casing B is in the form of a drum, preferably having a sheet-metal periphery and cast ends $b$, the ends being circumferentially flanged to fit upon the ends of the cylindrical portion and being drawn together by a pair of rods H $h$, carrying at their ends suitable nuts. This drum is loosely journaled upon a pair of trunnions $d$ $d$, forming the ends of the windlass-shaft D and journaled in the brackets C C', which are secured to the plate A. One of the trunnions $d$ carries a hand-crank $d'$, and the other trunnion is provided with a ratchet-wheel E, with which coöperates a gravity-pawl $e$, pivotally carried by the bracket C'.

The drum B has a lateral aperture, and its periphery is provided with a pair of outwardly-protruding lips F F at each side of this aperture. A door G is hinged at one side of this aperture, so as to open outwardly, and its swinging side is adapted to impinge against the corresponding lip F, which is sufficiently elastic to yield to its pressure. The door G is provided with a knob or handle $g$.

The rods H $h$ are of such length that their ends contact with the arms of the brackets C C', thereby limiting the angular movement of the drum B. As shown, the rod H serves as a hinge-pin for the door G.

The drum B is counterweighted, so that normally its apertured side is downward, and the construction already described provides for this counterweighting, as the lips F F and the door G are of sufficient weight to answer this purpose.

In use the line is made fast to the shaft D in any desired manner and wound thereupon by rotating the shaft by means of the crank $d'$, and the unwinding of the line is prevented by means of the ratchet E and pawl $e$.

When it is desired to use the line, the door G is opened, the pawl $e$ is thrown backwardly, and the line is drawn out, and strain upon it brings the drum to the position shown in Figs. 1, 2, and 4.

When the line is stored within the drum, the apertured side drops so that water is effectually excluded, as it will be prevented from beating into the joints around the door by the lips F F. There is no great strain to cause the opening of the door, and it may be held frictionally and made a sufficient tight fit to practically exclude all the dust and dirt.

I claim as my invention—

1. In a clothes-line reel, the combination with brackets, and a shaft journaled therein, and having a crank and a ratchet and pawl, of a drum journaled upon the shaft and having a lateral aperture flanked by protruding lips, a hinged door for closing such aperture, and stops for limiting the angular movement of the drum.

2. In a clothes-line reel, the combination with brackets, and a shaft journaled therein, and having a crank and ratchet and pawl, of a drum journaled upon the shaft and having a lateral aperture flanked by protruding lips, and a hinged door for closing such aperture, the drum being counterweighted so as to normally bring the apertured side downward.

NELSON BURR.

Witnesses:
C. J. GRIMES,
ANDREW BARR.